United States Patent Office 3,165,500
Patented Jan. 12, 1965

3,165,500
PROCESS FOR THE PRODUCTION OF
ACRYLONITRILE POLYMERS
Heino Logemann, Leverkusen, and Wilhelm Becker, Cologne-Stammheim, Germany, assignors to Farbenfabriken Bayer Aktiengesellschaft, Leverkusen, Germany, a corporation of Germany
No Drawing. Filed Jan. 17, 1961, Ser. No. 83,144
Claims priority, application Germany Feb. 17, 1960
9 Claims. (Cl. 260—79.3)

The present invention relates to a process for the polymerisation of acrylonitrile, if necessary with other vinyl compounds. High reaction velocities and conversions are obtained with this process even in spite of adding complex formers for heavy metals.

It is known to polymerise acrylonitrile in an aqueous medium with or without use of dispersion agents at pH values below 7, by itself or admixed with other vinyl compounds, with the aid of free-radical formers and advantageously with redox systems having a basis of per-compounds and sulphur compounds of low oxidation stages. The polymers so obtained serve for the production of shaped articles, such as filaments, fibres and the like. However, the thermostability of these acrylonitrile polymers is frequently too low and this can eventually lead to a strong yellowing, particularly at relatively high temperatures and in the presence of oxygen. This is particularly disadvantageous when using the filaments and fibres manufactured therefrom. The lack of thermostability is attributed inter alia to the presence of heavy metal ions, such as iron and copper ions and also silver and manganese ions, which originate from parts of the apparatus, are present in with added ingredients or are intentionally added to accelerate the polymerisation.

Consequently, it has already been proposed to add complex formers for the heavy metal ions in order to reduce the degree of discolouration caused thereby. In actual fact, the thermostability of acrylonitrile polymers can be improved in this way, but unfortunately the addition of complex formers leads to a strong lowering of the conversion and to a reduction in the polymerisation velocity.

For example, it is known that when polymerising acrylonitrile by means of persulphates and sulphur compounds of low oxidation stages in an acid medium, the conversion on adding complex formers (such as imidotriglycolic acid and ethylene diamine tetraacetic acid), is only 12 to 20% after a reaction time of 3½ hours (J. Polym. Sci. 32, 413 (1958)) and only 45% after 48 hours (French patent specification No. 1,178,785).

On account of these low conversions and low polymerisation velocities, the processes for improving the thermostability by adding complex formers for heavy metals still do not provide a satisfactory solution of the problem.

It is an object of the invention to provide a new process for the production of acrylonitrile polymers. It is another object to provide a polymerisation process for acrylonitrile with which a high reaction velocity and a high conversion is obtained in spite of adding complex formers for heavy metal ions. Yet another object of the invention is to provide acrylonitrile polymers with a high thermostability.

It has now been found that when producing acrylonitrile polymers with a predominant proportion of acrylonitrile by polymerising acrylonitrile by itself or together with other vinyl compounds in an aqueous medium at pH values below 7 with the aid of per-compounds, advantageously persulphates, and compounds of sulphur of low oxidation stage as redox systems, and also with addition of small quantities of heavy metal ions and complex formers for the latter, high polymerisation velocities and high conversions can be produced if the polymerisation takes place in the presence of formaldehyde sulphoxylate or formamidine sulphonic acid.

It is true that both formaldehyde sulphoxylate and formamidine sulphinic acid have reducing properties, but it is not possible to see in this fact the explanation for the effect according to the invention. Other reducing agents, such as sodium hydrosulphite and aromatic sulphinic acids, do not produce any increase in the conversion and in the polymerisation velocity.

It is known from German patent specification No. 880,399 that when polymerising vinyl compounds by means of redox systems based on compounds yielding oxygen and reducing agents, formaldehyde sulphoxylate can also be used as reducing agent. In this case, however, no complex formers for heavy metals are present and thus the polymerisation velocity and the conversion are not reduced thereby. The formaldehyde sulphoxylate merely acts as a reducing agent with respect to the catalysts yielding oxygen. The use of formaldehyde sulphoxylate as the sole reducing agent in the redox activator system moreover leads to products of low thermostability when polymerising acrylonitrile.

Even with knowledge of the technical teaching of German patent specification No. 880,939, it could not in any way be anticipated that formaldehyde sulphoxylate and formamidine sulphinic acid would increase the polymerisation velocity inhibited by addition of complex formers when using persulphates and sulphur compounds of low oxidation stage and would simultaneously increase the conversion which can be achieved.

The formaldehyde sulphoxylate or the formamidine sulphonic acid merely constitute an additive, but do not from the actual reduction components in the redox system.

The formaldehyde sulphoxylate and the formamidine sulphinic acid can be used as such or also in the form of their alkali metal salts and generally quantities from 0.01 to 0.1%, based on the monomer, are sufficient.

The addition can be made at the start or continuously during the polymerisation. If the additives according to the invention are added to a prepared mixture when all the other components have been supplied and the temperature has been adjusted to the required value, it will be seen how the liquid almost instantaneously becomes cloudy after the addition and the polymerisation starts with the precipitation of a white polymer. Thereafter, the polymerisation continues in the desired uniform manner without interruption until very high conversions are achieved.

The process of the invention is suitable for both polymerisation of acrylonitrile by itself and for copolymerisation with other vinyl compounds, such as esters of acrylic and methacrylic acids, styrene, vinyl chloride, vinylidene chloride and vinyl acetate. It is also possible to use vinyl compounds with reactive groups, such as unsaturated amines, amides or unsaturated carboxylic acids or sulphonic acids, such as acrylic acid and styrene sulphonic acid. Also to be considered are CH-acidic unsaturated compounds, such as unsaturated substitution products of trisulphonyl methane, but also NH-acidic compounds, such as unsaturated disulphonimides.

The actual polymerisation in accordance with the invention is carried out in the usual manner, water serving as polymerisation medium. Advantageously 500 to 1000 parts by weight of water are used to 100 parts by weight of monomer. The reaction temperatures are between 30 and 70° C., advantageously between 40 and 50° C. It has proved particularly advantageous to start polymerisation with some of the reactants and auxiliaries and then to add the rest of the components at a constant rate.

The pH value, which is below 7 and advantageously between 1 and 3, is generally adjusted with dilute sulphuric acid, but other mineral acids can also be employed. Strong organic acids, such as alkyl or aryl sulphonic acids, are likewise suitable.

The alkali metal salts and especially the sodium and potassium salts of persulphuric acid are suitable as per-compounds. The most important sulphur compounds of a low oxidation stage are: sulphur dioxide, alkali metal pyrosulphites, alkali metal bisulphites, alkali metal thio-sulphates and the corresponding ammonium salts. The alkali metal salts which are particularly satisfactory are the sodium and potassium salts. The per-compounds are used in quantities of 0.2 to 5%, advantageously 1 to 2%, related to the monomers to be polymerised. The sulphur compounds of low oxidation stage are used in quantities from 0.2 to 10%, advantageously 1 to 4%, related to the monomers to be polymerised.

As well as the heavy metal ions which have been entrained into the polymerisation mixture, it is also possible to add other heavy metal ions. These heavy metal ions, which preferably are added in the form of their salts, such as sulphates, chlorides or nitrates, include mainly the salts of divalent iron and copper. Generally speaking, quantities of from 0.00001 to 0.1%, related to the monomers used, are sufficient.

Especially suitable as complex formers for the heavy metal ions are the alkali metal fluorides, alkali metal pyrophosphates, alkali metal hexametaphosphates and the corresponding ammonium salts. The potassium and sodium salts are especially considered as alkali metal salts. Imido triglycolic acid and ethylene diamine tetraacetic acids are also quite suitable. The quantity of the complex formers to be added depends on the quantity of the heavy metal ions which are in the polymerisation system and which have been intentionally or unintentionally introduced. In general, the complex formers should be used in a large excess over the heavy metal ions, as regards the equivalent weight. Quantities of from 0.05 to 10%, advantageously 0.1 to 3% calculated on the monomers to be polymerised, are suitable.

Primarily to be considered as regulators are mercaptans and particularly more or less water-soluble aliphatic mercaptans, such as butyl mercaptans, hexyl mercaptans and ethylene, butylene or hexylene dithioglycols. The mercaptans which are especially suitable are those which carry a hydroxyl group adjoining the mercapto group, such as thioglycol. The quantity of these regulators depends on the desired molecular weight of the polymer and is in the region of 0.05 to 3%, preferably 0.1 to 0.3%, related to the initial compounds to be polymerised. It is found that as the amount of regulator added increases the molecular weight decreases.

Further advantages of the process according to the invention consist in the rapid initiation of the polymerisation, especially at low temperature, and the uniform and thorough polymerisation. In addition, the polymer has a very uniform grain and it can easily be filtered and dried. Spinning solutions of this product are very clear and do not clog the spinnerets.

In accordance with one preferred form of the process according to the invention, polymers which consist predominantly of acrylonitrile and a small portion of CH-acidic compounds or NH-acidic compounds are produced. They can, in addition, also contain comonomers which are usual in acrylonitrile polymers, such as acrylic and methacrylic acid esters and vinyl chloride.

The following are considered as polymerisable CH-acidic compounds: p-methacroylaminophenylsulphonyl methylsulphonyl cyanomethane, p-vinylphenylsulphonyl methylsulphonyl cyanomethane, m-methacroylaminophenylsulphonyl dicyanomethane, p-methacroylaminophenylsulphonyl dimethylsulphonyl methane, p-methacroylaminophenylsulphonyl methylsulphonyl acetic acid methyl ester and p-methacroylaminophenylsulphonyl methylsulphonyl methane sulphonic acid methyl ester (cf. copending U.S. application Serial No. 44,560).

Unsaturated disulphonimides are especially to be considered as NH-acidic compounds for the copolymerisation (cf. copending U.S. application Serial No. 8,925, now U.S. Patent 3,052,656). The following are referred to as specific unsaturated disulphonimides which are suitable: vinyl benzene benzene disulphonimide, vinyl benzene methyl disulphonimide and its derivatives which are substituted in the aromatic nucleus by organic radicals (such as alkyl, aryl, hydroxyalkyl, hydroxyaryl, halogen and other groups). For the production of these disulphonimides, styrene sulphonimide is reacted with benzene- and/or methane-sulphonic acid chloride in an alkaline medium in accordance with processes known per se. The choice of initial components depends on the substituted disulphonimides which are required.

Also suitable are reaction products of unsaturated acid halides or anhydrides, such as acrylic, methacrylic or crotonic acid chlorides and maleic acid anhydride with those disulphonimides which contain groups capable of being acylated (such as a primary or secondary amino group or a hydroxyl group). These disulphonimides are also obtained by processes known per se (see for example U.S. patent specification No. 2,374,934, Example 2).

Reaction products of unsaturated isocyanates, such as ($\beta$-isocyanatoethyl)-methacrylate with hydroxy- or amino-disulphonimides are also to be mentioned and these products can be obtained by processes known per se.

The present invention is further disclosed in the following examples, which are illustrative but not limitative thereof.

EXAMPLE 1

95 parts by weight of acrylonitrile and 5 parts by weight of methyl acrylate are introduced for polymerisation purposes into a batch comprising 675 parts by weight of water, 25 parts by weight of normal sulphuric acid, 2 parts by weight of potassium persulphate, 7.5 parts by weight of sodium pyrosulphite ($Na_2S_2O_5$) and 1 part by weight of the sodium salt of ethylene diamine tetraacetic acid. A quantity of iron corresponding to 0.00015 part by weight of iron is introduced with the reagents as an impurity into the batch. The polymerisation is carried out by vigorously mixing for a short time and then leaving the mixture to stand without movement in a closed vessel from which air is excluded. If the following additives are added in the form of aqueous solutions to the prepared batch or mixture, the following yields are found:

|  | After 90 minutes at 20° C. | After 30 minutes at 45° C. |
| --- | --- | --- |
|  | Percent | Percent |
| Without additive | 0 | 2 |
| With 0.01 part by weight of the sodium salt of formaldehyde sulphoxylic acid ($CH_2OH.SO_2Na.2H_2O$) | 6 | 7 |
| With 0.1 part by weight of $CH_2OH.SO_2Na.2H_2O$ | 44 | 53 |
| With 0.1 part by weight of sodium hydrosulphite ($Na_2S_2O_4$) | 0 | 2 |
| With 0.1 part by weight of formamidine sulphinic acid $HO_2S-C\diagup^{NH}_{\diagdown NH_2}$ | 18 | 12.5 |
| With 0.1 part by weight of the sodium salt of toluene sulphinic acid | 0 | 2 |

EXAMPLE 2

Into a stirrer-type vessel which can be heated, and which contains 675 parts by weight of water and 25 parts by weight of normal sulphuric acid, there are introduced 95 parts by weight of acrylonitrile, 5 parts by weight of methyl acrylate, 2 parts by weight of potassium persulphate and 4 parts by weight of sodium pyrosulphite (Na$_2$S$_2$O$_5$), in the presence of 1 part by weight of the sodium salt of ethylene diamine tetraacetic acid and 0.3 part by weight of thioglycol. The introduction is performed under a nitrogen atmosphere and at a temperature of 43° C. The quantity of iron in the mixture, allowing for the quantity introduced with the reagents, corresponds to 0.0008 part by weight of FeSO$_4$·7H$_2$O. After adding 0.03 part by weight of the sodium salt of formaldehyde sulphoxylic acid, which is dissolved in a small quantity of water, the polymerisation is immediately started and the polymer separates out forthwith in the form of a good uniform grain. After 1 hour, another 0.015 part by weight of the sodium salt of formaldehyde sulphoxylic acid is added, whereby a further acceleration is produced. After three hours, a quantity, corresponding to half of the monomer originally introduced, of the persulphate, pyrosulphite and thioglycol solution is added and the same addition is made once more after another three hours. After polymerisation for 22 hours at 43° C., a product with a K-value according to Fikentscher (Cellulosechemie 32 (1932), page 60) of 80 is obtained, with a total conversion of 90%.

EXAMPLE 3

95 parts by weight of acrylonitrile and 5 parts by weight of methyl acrylate are used for polymerisation purposes with 1 part by weight of methacrylic acid aminobenzene disulphonimide in 700 parts by weight of water and in the presence of 0.3 part by weight of thioglycol, 0.007 part by weight of ferrosulphate and 1 part by weight of the sodium salt of ethylene diamine tetraacetic acid at 45° C. The mixing is performed in a stirrer-type vessel under a nitrogen atmosphere. The pH value of the aqueous phase is adjusted with normal sulphuric acid to a value of 3. First of all the aqueous phase is brought to the required temperature, then the monomers are added and finally 2 parts by weight of potassium persulphate in the form of a 5% aqueous solution are added. The polymerisation then starts quickly and uniformly if, in addition, 0.03 part by weight of the sodium salt of formaldehyde sulphoxylic acid is added in the form of a 2% aqueous solution.

After three hours with the temperature kept constant at 45° C., half of the above mixture without the sodium salt of formaldehyde sulphoxylic acid is added in four additions at intervals of 1 hour, until the polymerisation vessel is completely full. After another 5 hours, a solution of 0.5 part by weight of potassium persulphate in a little water is added. After a total of 15 hours, a product having a good dyeing capacity and thermostability is obtained with a yield of 90%.

EXAMPLE 4

95 parts by weight of acrylonitrile, 5 parts by weight of methyl acrylate and 1.5 parts by weight of methacryl-amino-benzene benzene disulphonimide are polymerised at 50° C. in 700 parts by weight of water and 25 parts by weight of normal sulphuric acid with the following polymerisation and regulator systems:

*Table*

| Experiment No. | Parts Potassium Persulphate | Parts Sodium Pyrosulphite | Parts Sodium Salt of Formaldehyde | Parts Complex Former | Parts Copper Sulphate | Parts Thioglycol | Conversion, percent | Hours | K-value | Thermo-Stability Factor |
|---|---|---|---|---|---|---|---|---|---|---|
| 1 | 1 | 1 | 0.2 | ¹1 | 0.01 | 0.5 | 60 | 8.5 | 81 | 2 |
| 2 | 2 | 3 | 0.2 | ¹1 | 0.01 | 0.5 | 88 | 8.5 | 102 | 2.5 |
| 3 | 3 | 5 | 0.2 | ¹1 | 0.01 | 0.3 | 83 | 5 | 95 | 2.5 |
| 4 | 2 | 1 | 0.2 | ²2 | 0.0025 | 0.5 | 90 | 8.5 | 82 | 4 |
| 5 | 2 | 3 | 0.2 | ²2 | 0.0025 | 0.5 | 88 | 8.5 | 85 | 2.5 |
| 6 | 2 | 4 | 0.2 | ²2 | 0.0025 | 0.5 | 83 | 8.5 | 86 | 2.5 |
| 7 | 3 | 1 | 0.2 | ²2 | 0.0025 | 0.5 | 83 | 5 | 90 | 2.5 |
| 8 | 3 | 3 | 0.2 | ²2 | 0.0025 | 0.5 | 80 | 8.5 | 78 | 2.5 |
| 9 | 3 | 5 | 0.2 | ²2 | 0.0025 | 0.3 | 90 | 5 | 93 | 2.5 |

¹ Sodium salt of ethylene diamine tetraacetic acid.
² Imidotriglycolic acid.

We claim:
1. In a process for producing acrylonitrile polymers with a predominant proportion of acrylonitrile by polymerizing acrylonitrile in an aqueous medium at pH values below 7 in the presence of (1) a heavy metal ion selected from the group consisting of divalent iron and copper in an amount of 0.00001 to 0.1%, based on the weight of monomers, and (2) a complex former for said heavy metal ion selected from the group consisting of ethylene diamine tetraacetic acid, imido triglycolic acid, the alkali salts of hydrofluoric acid, the alkali salts of pyrophosphoric acid, and the alkali salts of hexametaphosphoric acid, said complex former being employed in an amount of 0.5–10% by weight, based on the weight of monomers, the improvement which comprises conducting said polymerization at a temperature of 30–70° C. with the aid of a redox system consisting of a mixture of an alkali salt of persulfuric acid and an alkali salt of pyrosulfurous acid, each salt being employed in an amount of 0.2–5% by weight of monomers and in the presence of a compound selected from the group consisting of formaldehyde sulfoxylate and formamidine sulfinic acid.

2. The process of claim 1 wherein the compound selected from the group consisting of formaldehyde sulfoxylate and formamidine sulfinic acid is employed in an amount of 0.01–0.1% based on the starting materials to be polymerized.

3. The process of claim 1 wherein a regulator of the molecular weight of the polymer is included in the polymerization system.

4. The process of claim 1 wherein acrylonitrile is copolymerized with a vinyl monomer which is copolymerizable therewith.

5. The process of claim 1 wherein acrylonitrile is copolymerized with methyl acrylate, the heavy metal ion is iron, the complexing agent therefor is the sodium salt of ethylene diamine tetraacetic acid, and the redox system consists of potassium persulfate and sodium persulfite.

6. The process of claim 5 wherein thioglycol is added as a regulator, and a portion of the sodium salt of formaldehyde sulfoxylic acid is added prior to the initiation of polymerization and the remainder is added after the initiation of polymerization, thereby obtaining a high degree of monomer conversion.

7. The process of claim 1 wherein acrylonitrile is copolymerized with methyl acrylate and methacrylic acid amino benzene disulfonamide.

8. The process of claim 1 wherein acrylonitrile is copolymerized with methyl acrylate and methacrylamino-benzene benzene disulfonimide.

9. The process of claim 8 wherein the polymerization system also contains thioglycol as a regulator.

References Cited in the file of this patent

UNITED STATES PATENTS 2,356,925 Fryling _____ Aug. 29, 1944
2,635,090 Basdekis _____ Apr. 14, 1953
2,697,700 Uraneck et al. _____ Dec. 21, 1954

OTHER REFERENCES

Brown et al.: Chem. Abs., vol. 48 (1954), page 10, 367g.